March 21, 1944.  J. H. BUCKNAM ET AL  2,344,534
METHOD OF AND APPARATUS FOR STRIP WELDING
Filed Feb. 3, 1938  10 Sheets-Sheet 2

INVENTORS
JAMES H. BUCKNAM
ALFRED J. MILLER
STANLEY H. ROYER

BY  ATTORNEY

March 21, 1944.        J. H. BUCKNAM ET AL        2,344,534
METHOD OF AND APPARATUS FOR STRIP WELDING
Filed Feb. 3, 1938        10 Sheets-Sheet 3
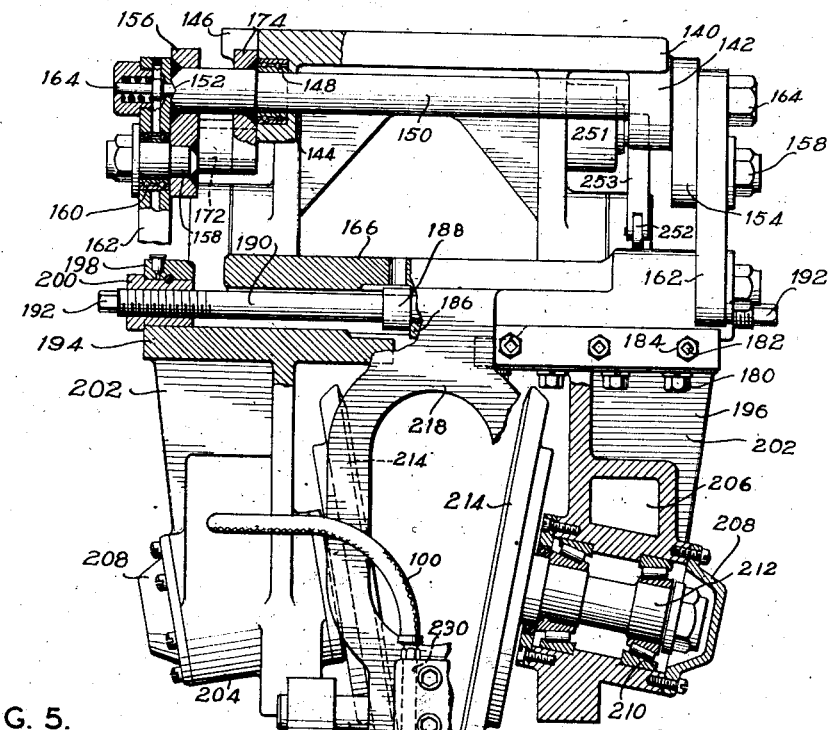
FIG. 5.
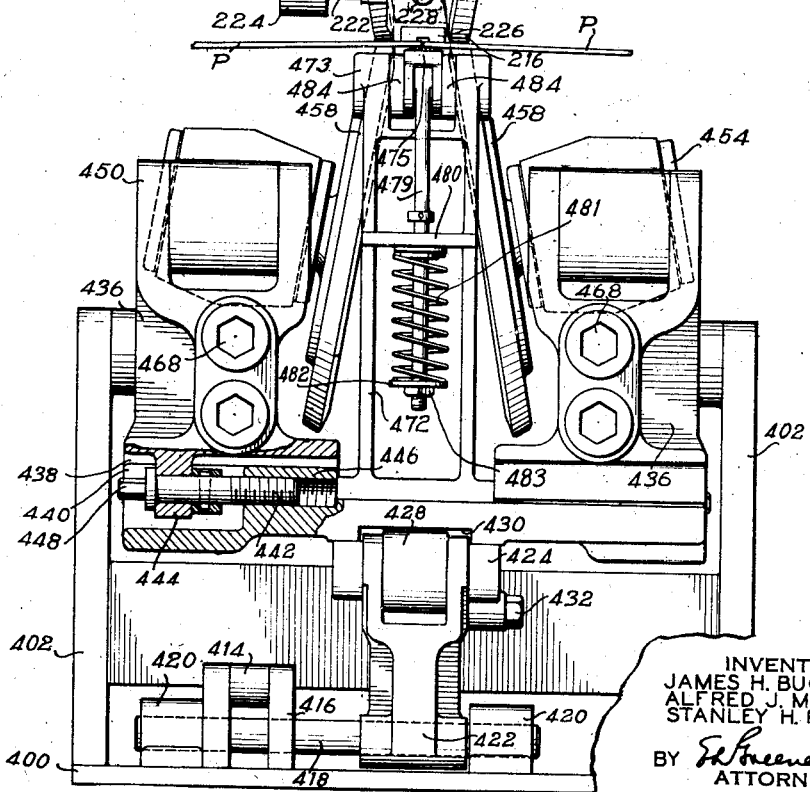
INVENTORS
JAMES H. BUCKNAM
ALFRED J. MILLER
STANLEY H. ROYER
BY
ATTORNEY March 21, 1944.    J. H. BUCKNAM ET AL    2,344,534
METHOD OF AND APPARATUS FOR STRIP WELDING
Filed Feb. 3, 1938    10 Sheets-Sheet 4

INVENTORS
JAMES H. BUCKNAM
ALFRED J. MILLER
STANLEY H. ROYER
BY *Greenewald*
ATTORNEY March 21, 1944. J. H. BUCKNAM ET AL 2,344,534
METHOD OF AND APPARATUS FOR STRIP WELDING
Filed Feb. 3, 1938 10 Sheets-Sheet 5

INVENTORS
JAMES H. BUCKNAM
ALFRED J. MILLER
STANLEY H. ROYER
BY *Greenewald*
ATTORNEY March 21, 1944.  J. H. BUCKNAM ET AL  2,344,534
METHOD OF AND APPARATUS FOR STRIP WELDING
Filed Feb. 3, 1938   10 Sheets-Sheet 6

INVENTORS
JAMES H. BUCKNAM
ALFRED J. MILLER
STANLEY H. ROYER
BY
ATTORNEY

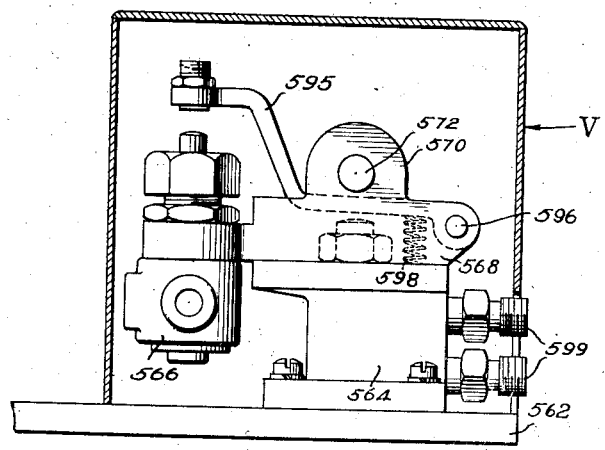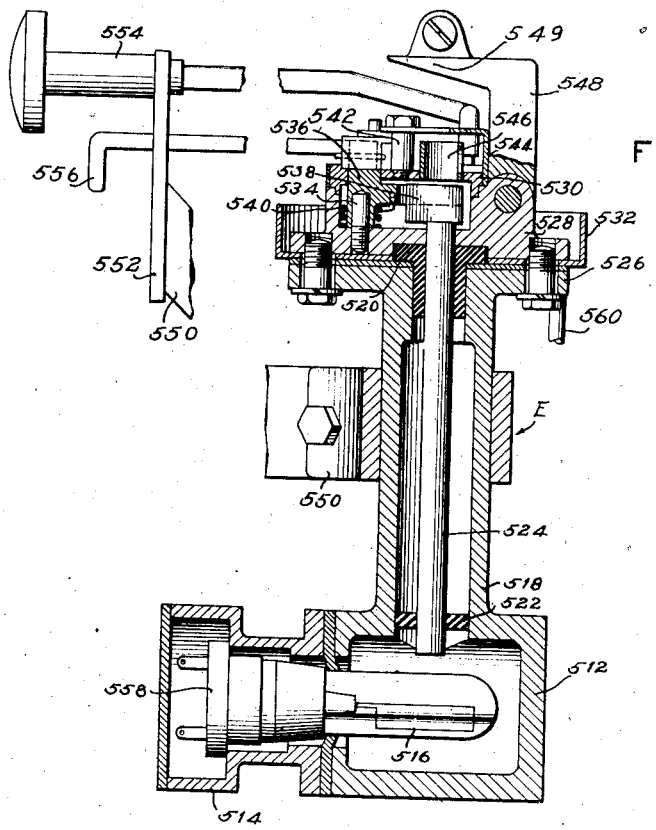

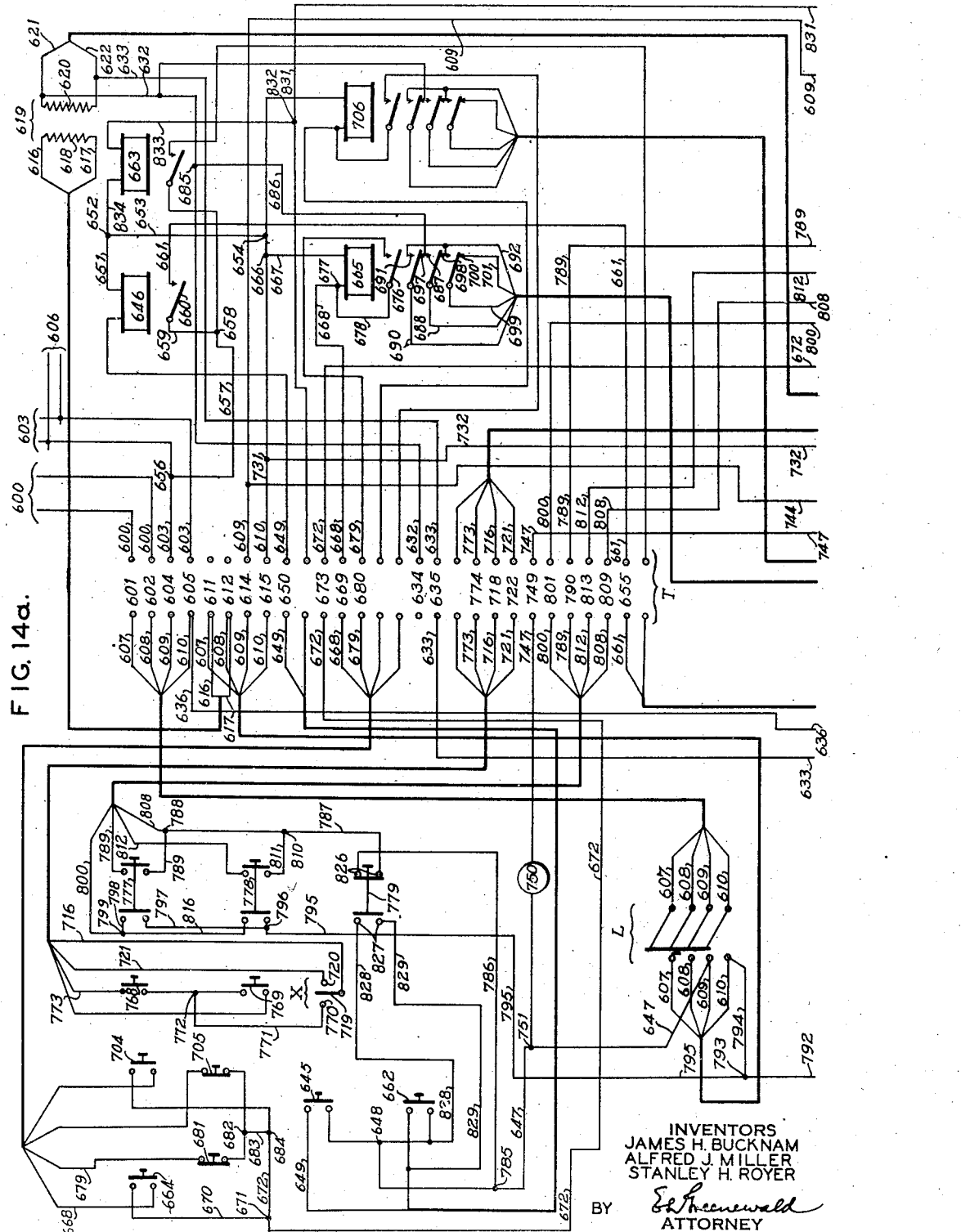

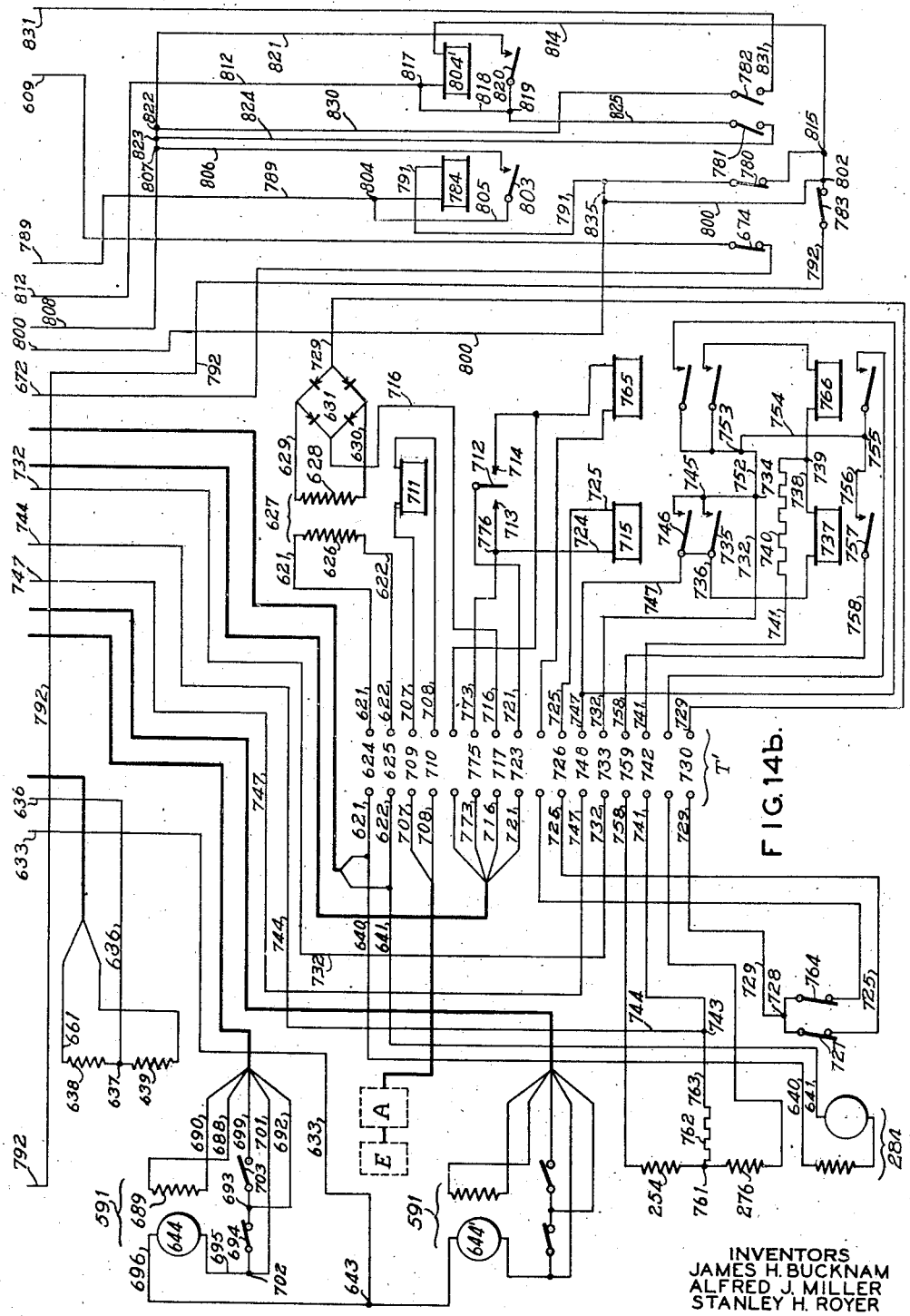

Patented Mar. 21, 1944

2,344,534

UNITED STATES PATENT OFFICE 2,344,534

METHOD OF AND APPARATUS FOR STRIP WELDING

James H. Bucknam and Alfred J. Miller, Cranford, and Stanley H. Royer, Elizabeth, N. J., assignors to The Linde Air Products Company, a corporation of Ohio Application February 3, 1938, Serial No. 188,468

15 Claims. (Cl. 113—59)

This invention relates to the art of welding. More particularly, the invention concerns a method of welding metal sheets or strips into continuous strips and to an automatically controlled apparatus for performing the method.

Present day practice in the production of sheet steel has tended steadily toward the continuous strip mill process, the successful development of which has been attained in fairly recent years. By this method, sheet steel is produced by rolling out the white hot ingot into strips varying from 20 to 100 inches in width and approximately 150 to 500 feet in length. Upon emerging from the hot finishing mills, these long, hot rolled strips are wound into coils and sent to the cold finishing mills.

Before the cold rolling operation, the strips are unwound, stitched together, passed through a continuous pickling bath and washed in cold water. As the stitching forms merely a temporary joint, which is usually of the overlap type, it must be removed before the strips are cold rolled; as the stitched joint will not stand the strain imposed on the strips during cold rolling.

Obviously, if it were possible to form a joint between the strips so made that it could remain in the strip during the cold finishing process, production would be greatly facilitated, as the increased length of strip cold rolled would correspondingly decrease the amount of handling required per ton of steel. This joint between the strips could be formed therein at sometime subsequent to the hot rolling operation and prior to the cold rolling operation and either before or after the strips are pickled and washed.

As a solution to this problem, it is proposed to provide an improved method and a novel apparatus for butt welding adjacent strips in such a manner that the joint may remain in the continuous strip during the cold rolling. As one of the novel features of this improved method, it is proposed to lessen the amount of strain on this joint by shearing the strip edges on a taper so that the seam between adjacent strips extends diagonally across the continuous strip. When the composite strip is cold rolled, the cold rolling mills thus will engage adjacent portions of the joint successively, minimizing the tension imposed on the joint by the cold rolling operation.

Prior art machines for forming butt welds have generally relied upon a single set of members for both holding the edges of the members to be welded tightly together and for maintaining the adjacent edges of the members in alignment suitable for welding so that one edge will not be higher than the other. For proper operation, these clamping members are relatively large and must necessarily be located in the heat zone of the weld. Due to their size and location, these large clamps rapidly conduct a great deal of heat away from the weld thereby decreasing the economy of forming the welded joint.

To overcome this objectionable feature, the novel apparatus of the invention maintains the adjacent strip edges in tight engagement by clamps or other means which engage the strips at points considerably spaced from the line of welding; and maintains the edges of the strips in accurate alignment for the welding operation by relatively smaller auxiliary members, such as rolls and presser feet, which are located in the heat zone of the weld. As these relatively small members located in the heat zone carry less heat away from the weld, the economy of operation is increased; while, at the same time, the accuracy of alignment of the strip edges is increased.

It is therefore an object of this invention to provide an improved method of welding steel sheets into a single strip. Another object is to produce a new welded product. Other objects are to provide: a machine for practicing such welding; a machine capable of forming smooth joints which can remain in the strip during the cold rolling process; a machine including separate, simultaneously operated welding units, each adapted to form a portion of the welded joint, of a length differing from that formed by the other; a machine including means to maintain the strip edges in accurate alignment without conducting an excessive amount of heat from the weld; and a machine including means automatically maintaining the heat applied to the work at a uniform value, means automatically controlling the movement of each unit along the work in synchronism with the other, and means automatically interrupting the operation of each unit when its portion of the welded joint has been completed.

These and other objects of the invention will in part be obvious and in part become apparent from the following description and accompanying drawings, in which:

Fig. 5 is a front elevational view, partly in section, of the left hand welding unit shown in Fig. 1;

Fig. 10 is a vertical sectional view through the photoelectric cell assembly;

Fig. 13 is a vertical sectional view, taken on the line 13—13 of Fig. 11, looking in the direction of the arrows; and Figs. 14a and 14b together constitute a wiring diagram showing the electric circuits for controlling the operation of the left hand welding unit.

Figure 1:
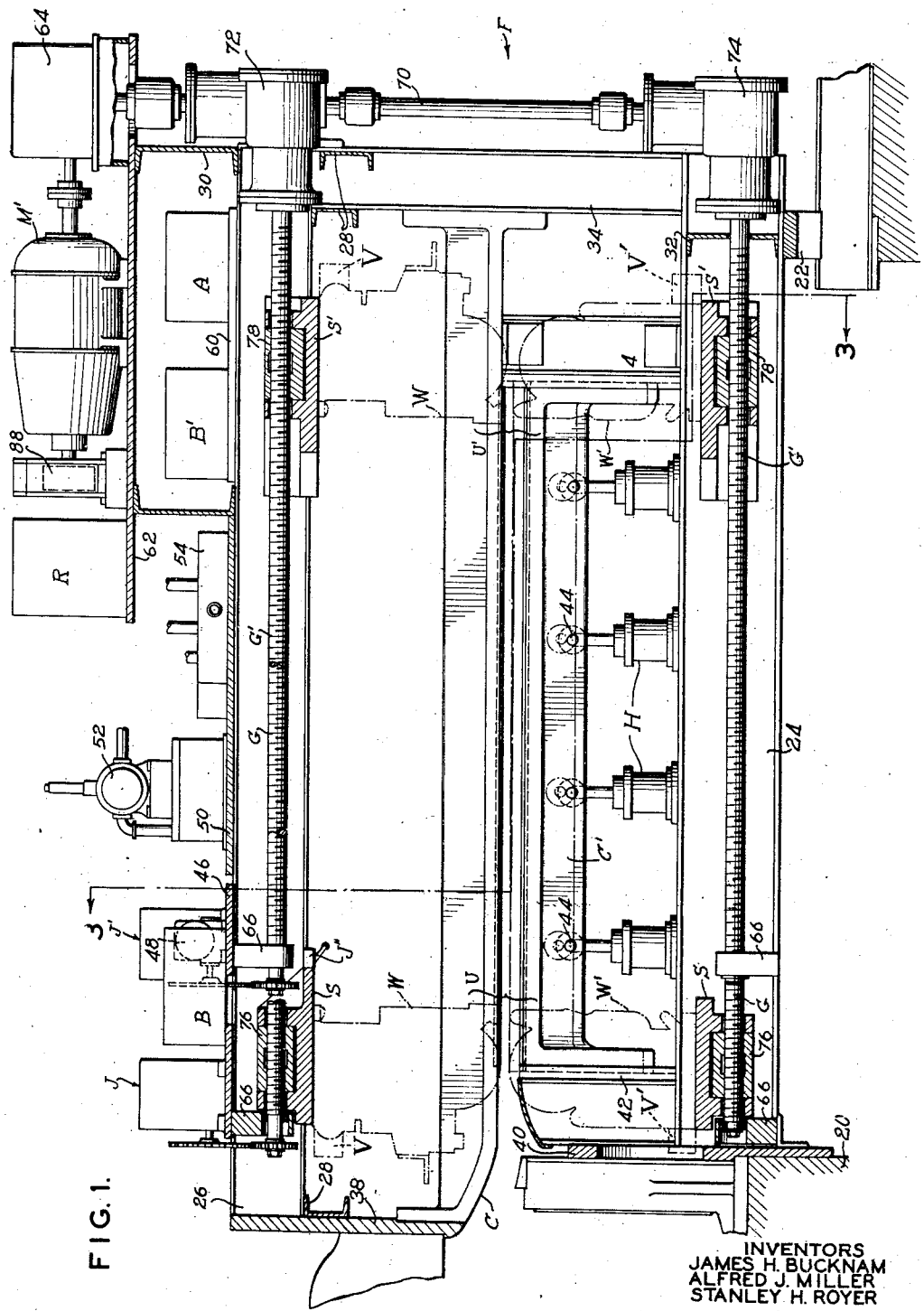
Fig. 1 is a view, partly in front elevation and partly in section, showing the welding apparatus mounted on a suitable supporting frame.
Figure 2:
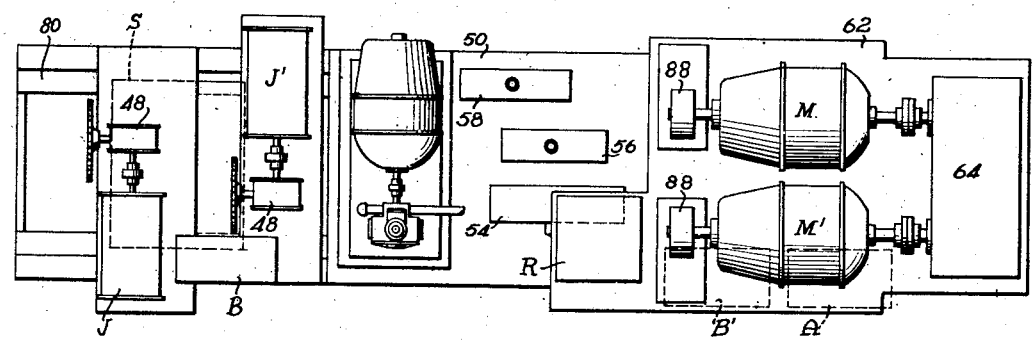
Fig. 2 is a plan view of the apparatus shown in Fig. 1.
Figure 3:
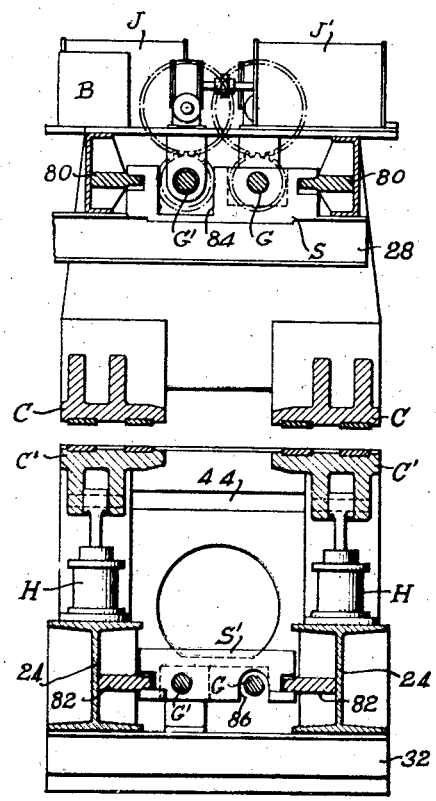
Fig. 3 is a vertical sectional view, taken on the line 3—3 of Fig. 1.

Generally speaking, the improved welding method of the invention is practiced by first shearing the sheets or strips to be welded along a line which is non-perpendicular to the edges of the sheet. In practice, the sheets are generally sheared on a taper of one inch per foot out of square. The strips to be welded are then firmly clamped on a suitable supporting frame at points considerably spaced from the welding zone and with their adjacent edges in tight engagement.

In the preferred embodiment of the welding procedure and apparatus disclosed herein, welding units are simultaneously moved in opposite directions from the outer edges of the strip toward the center, while the strip edges are held in accurate alignment by auxiliary means located in the heat zone of the weld, to form a welded joint. It will be apparent that if the movement of the units were continued until they met at the center, a small central portion of the strip edges would not be weld united. Accordingly, the movement of one unit is automatically reversed at a predetermined point in its travel before the unit reaches the center of the strip, and the forward movement of the other unit is continued past the center of the strip and slightly past the same predetermined point to complete the welded joint.

While, for rapidity of operation, it is generally desirable to use two units simultaneously and heat both the upper and lower sides of the strip edges, the upper side of the strip edges only may be similarly heated; or the invention may be practiced by moving one unit along the entire length of the abutting edges and heating both the upper and lower sides of the edges or one side only. The novel arrangement of clamps and presser elements permits the attainment of good quality tail ends or finishes in the weld with only one unit.

As best shown in Figs. 1 to 4, inclusive, one form of apparatus for practicing the above outlined method comprises a stationary supporting frame F on which the sheets or strips P to be welded are supported in proper position for welding between pairs of clamps C, C'. It will be noted that the clamps C, C' are each spaced from the edges to be welded so that these relatively large members, which have extensive stationary surface engagement with the sheets P throughout substantially the full width thereof, will be far enough from the heat zone of the weld that no appreciable amount of heat will be carried from the weld by the clamps. Left and right hand welding units U and U', respectively, each comprising an upper welding machine W and a lower welding machine W', are secured to travelling supports such as slides S and S', respectively, movable longitudinally of the frame F along the seam to be welded. Hydraulic cylinders H are mounted on the frame and secured to the lower clamps C' for moving the latter vertically to clamp the sheets or strips P between the lower clamps C' and the upper fixed clamps C.

Each welding machine W, W' includes relatively small movable means having limited and progressive line contact with the sheets adjacent their abutting edges and movable heating means. The movable heating means comprises a high temperature heating medium which is preferably an oxy-fuel gas blowpipe, although other heating mediums such as an electric arc may be used. The relatively small movable means may comprise a pair of presser rolls engaging the sheet or strip edges on either side of the welding line and one or more presser feet directly engaging the strip edges along the welding line. The presser rolls and presser feet on the upper and lower machines of each unit cooperate to maintain the sheet or strip edges in accurate alignment for the welding operation. To further insure a good welded joint between the sheets or strips to be welded, one of the presser feet on each lower machine W' may be located directly beneath the preheat flames of the upper heating unit and be so formed that its upper edge, engaging the under side of the work has a V contour transversely of the seam. This presser foot will thus exert an upward bending force on each of the opposed strip edges to "peak" or upset the adjacent edges of the sheets or strips slightly as they are heated. This condition is not only very desirable for uniform and economical welding but also accurately maintains the edge alignment and permits relatively wide tolerances in the preparation of the sheets or strips for welding.

To take up any excess metal present from the shearing operation, the sheets or strips P are so placed on the frame F that a loop is formed in the strips between the clamps C, C' and the presser feet and rolls. To control this loop, the seam to be welded is disposed at a slightly higher elevation than that of the clamps C, C', thereby increasing the pressure with which the adjacent edges of the sheets are forced into engagement during the welding operation. This bowing or looping of the sheets or strips between the clamps and the presser elements may be accomplished by beveling the clamps or by placing spacers thereon of a sufficient height to give the desired contour to the sheets or strips between the clamps. In practice, the horizontal spacing of the clamps is usually about ten inches and the edges to be welded are about 1¼ inches higher than the level of the clamps.

Also mounted upon the frame F, as will be described in more detail hereinafter, are suitable mechanisms, such as the motors M and M', each operatively associated with one of the welding units and which actuate shafts G and G', respectively, for moving the slides attached to the welding units, limit switches J and J' actuated, respectively, by shafts G and G', control boxes B and B', relay panel R, and photoelectric cell amplifier unit A, and motor driven valve operating mechanisms V and V', the latter being carried by the welding machines W and W'. Within the control boxes B and B' are control circuits, each operatively associated with one of the mechanisms mentioned above and including an element or elements operative when the welding unit controlled by the circuit reaches a predetermined point in its path of travel, to interrupt the energization of the mechanism associated with said unit. Preferably, said elements are operative in such sequence that one unit welds a greater length of the seam than the other unit.

Operation of the apparatus is controlled by push buttons and switches mounted in the control boxes B and B', one of which controls the left hand unit U and the other of which controls the right hand unit U'. The sheets or strips P to be welded are placed on the lower clamps C' and fluid is admitted to the cylinders H to raise the lower clamps so that the sheets are firmly held between the upper and lower clamps with their adjacent edges in juxtaposition. When this has been accomplished, a button on the control panel is depressed to bring the upper and lower welding machines W and W', respectively, of each unit U or U', into operative relation with the work. Depression of other buttons energizes the valve operating mechanisms V and V', each controlling the supply of oxygen and a combustible gas to the upper and lower blowpipes of one unit U or U'. An additional valve on each upper valve operating mechanism V or V' may, if desired, be used to control an air blast to blow the excess heat in a forward direction from between the rolls, and a similar valve on the lower valve operating mechanism controls the flow of fluid to a water jet adjacent the under side of the weld, which water jet will be more fully described hereinafter. When the blowpipes have been lighted, another set of push buttons is depressed to close the circuits to motors M and M' to move the welding units U and U' from the ends of the welding line toward the center. As left hand unit U approaches the center of the welding line, it is automatically retracted from the work, its associated motor is automatically reversed and the associated valve operating mechanisms V automatically energized to interrupt the supply of gaseous heating mixture to its blowpipes and the above mentioned air blast. This operation may be effected by the limit switch J which, although shown as a single unit, comprises a plurality of switches controlling various circuits; or it may be effected by another limit switch J" mounted on the upper left hand slide S. The right hand unit U' moves past the center of the welding line to weld the overlap between the units. The unit U' is then retracted from the sheets P, its movement similarly reversed, and the associated valve controlling mechanisms V' energized to close its respective valves.

Although the apparatus is fully automatic in operation, separate controls are provided so that it may be manually operated, if desired. For instance, it is sometimes desirable to automatically control the movement of left hand unit U along the welding line and manually control the movement of right hand unit U' therealong. Such a procedure permits a very accurate control of the welding of the overlap between the units in case the length of this portion of the seam varies due to unforeseen circumstances. In this instance, interference between the units is prevented by the limit switch J" which causes reversal of the unit U when it is actuated by contacting unit U'.

The penetration of the weld is either automatically or manually controlled by varying the distance between the upper blowpipes and the work, and a suitable switch is incorporated in each control box B for selecting the desired control. Manual control is accomplished through the actuation of push buttons which complete circuits to the blowpipe moving mechanism moving this mechanism either up or down independently of the automatic control.

Automatic control is effectuated by means of a photoelectric cell assembly E mounted on each welding mechanism W' in a position to be affected by the emission of radiant energy from the underside of the weld. This control system is similar to that described in U. S. Patent No. 2,089,014, issued on August 3, 1937, to J. H. Bucknam et al. In the present apparatus, instead of varying the speed with which the blowpipe traverses the work, it is preferred to vary the distance between the blowpipe and the work. This procedure affords a more sensitive control of the quality of the weld. As the amplifying means for the photoelectric cell is similar to that described in the above-mentioned patent, only such portions of the amplifier have been shown in the drawings and described herein as are necessary to a complete understanding of the present invention.

Another method of accurately manually controlling the heat applied to the weld is to provide a current meter, showing the output current reading of the photoelectric cell amplifier unit A, in a position where it may be observed by the operator. The operator, by noting the meter reading may then actuate the push buttons manually controlling the blowpipe moving mechanism to maintain the blowpipe in proper relation to the work so that the correct amount of heat is applied to the weld at all times.

While the above apparatus has been described as controlled by a plurality of push buttons which respectively move the welding units into position, turn on the various gases to the blowpipes, and start the movement of the units, it will be obvious that this control may be simplified considerably by providing additional contacts on certain of the operating buttons whereby, if both units U and U' are used simultaneously, the entire operation may be controlled by only three push buttons. In this instance the push buttons used include one button for starting each unit and an additional button for moving both units into operative relation with the work to be welded. The stopping of the units is controlled fully automatically by limit switches which are actuated when each unit has reached its limit of operation. If only one unit is used, then the entire operation of this unit may be controlled by means of one push button for starting the operation of the unit and an additional push button for moving the unit into its proper relation to the work to be welded.

The various electric circuits for operating the apparatus are shown in Figs. 14a and 14b, and will be fully described in a later part of this specification. The main elements of the apparatus will now be described in detail.

In the embodiment of the invention selected for illustration in the drawings, and as shown in Fig. 1, the frame F may be secured at one end to a suitable support 20, and at its opposite end may rest on a suitable bearing member 22. The frame consists of longitudinal members 24 and 26, cross members 28, 30, and 32, uprights 34 and 36, and end plates 38 and 40. The hydraulic cylinders H are mounted on the members 24 and have their pistons pivotally conected at their upper ends to the clamps C' which are adapted to move in guides 42 and are connected by cross members 44. The upper clamps C are rigidly connected to the uprights 34, 36 and to the end plate 38.

A plate 46, secured to members 26, supports the left hand unit control box B, the limit switches J and J', and gearing 48 for connecting the limit switches J and J' to the threaded shafts G and G', respectively. Another plate 50, secured to members 26 adjacent plate 46, supports a hydraulic pump 52, a solenoid operated hydraulic valve 54 controlling cylinders H, and solenoid operated hydraulic valves 56 and 58 controlling the vertical position of the welding units U and U', respectively, relative to the welding seam. A third plate 60 also mounted on members 26, supports the control box B' for the right hand unit and the photoelectric cell amplifying unit A.

Figure 4:
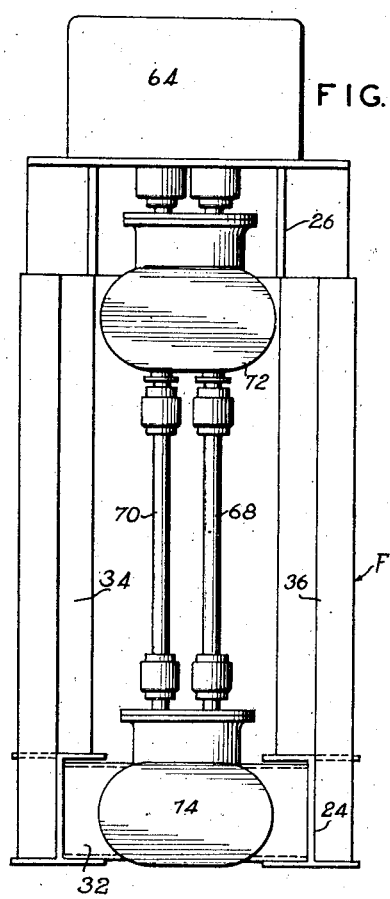
Fig. 4 is a right hand end elevational view of the apparatus shown in Fig. 1.

Mounted on the cross members 30 above the plate 60 and overhanging the members 30 is a fourth plate 62 on which are mounted relay box R, motors M and M' and gear reduction unit 64 connected to motors M and M' and to vertical shafts 68 and 70 (Fig. 4). Shafts 68 and 70, through gear reduction units 72 and 74, drive threaded shafts G and G', respectively, each supported at its inner end in a bearing 66. As may be seen from the drawings, motor M drives shafts 68 and G, to the latter of which are operatively connected, through travelling nuts 76, the slides S; and motor M' actuates slides S' through shafts 70 and G', and travelling nuts 78. The upper pair of slides moves on rails 80 (Fig. 3) extending inwardly from members 26 and the lower slides move on similar rails 82 mounted on the members 24. Each slide S is formed with a recess 84 to accommodate shaft G' and each slide S' has a similar recess 86 to accommodate shaft G.

It will be understood from the above description, that the driving shaft for the upper machine W of each unit is interlocked with the driving shaft for the lower machine W'. Each motor M or M' is operatively associated with a limit switch J or J', respectively, and provided with a shoe brake 88 to permit rapid reversal of the motor at the time the units U and U' meet.

As the right hand unit U' is identical with the left hand unit U, only the latter will be described in detail, and it should be understood that the following description applies equally well to either unit. The unit U, shown in detail in Figs. 5, 6, and 7, includes an upper welding machine or carriage W comprising a mounting base or plate 140 which may be bolted or otherwise secured to the upper slide S shown in Fig. 1. At one end, this plate is provided with a pair of spaced depending ears 142 and 144, of which the ear 142 is in alignment with one edge of the plate. The ear 144 is spaced inwardly from the opposite edge of the plate which latter is provided with a cutaway portion 146 to accommodate movement of the positioning linkage for the member W. Each ear 142 or 144 has a bearing 148 mounted therein, which bearings support a shaft 150 provided with a recess 152 in each end thereof and extending beyond the ears. Links 154 and 156 are rigidly mounted on opposite ends of the shaft 150, and in the free end of each link is secured an outwardly projecting pin 158. Each pin pivotally supports, by means of a bearing 160, a link 162, the upper end of which is provided with a spring pressed detent 164 for at times engaging one of the recesses 152. At their lower ends the links 162 are pivotally connected to one end of an upper slide plate 166. Another pair of depending ears 168 are formed integrally with the opposite end of the mounting plate 140, and the lower ends of these ears are pivotally connected to the opposite end of the slide plate 166. A hydraulic cylinder 170 is pivotally connected to one of the depending ears 168 and the piston of this cylinder is pivotally connected to a pin 172 extending between the link 156 and a link 174 secured to the shaft 150 adjacent the ear 144. When fluid is admitted into one end of the cylinder 170, its piston will force the pin 172 outwardly to the position shown in Fig. 6, thus aligning the links 154 or 156 and the links 162 and moving the plate 166 and its attached parts downwardly. This brings the upper machine W into operative position. When fluid is admitted into the other end of cylinder 170, the pin 172 is drawn to the right from the position shown in Fig. 6, consequently causing the plate 166 to be moved upwardly by its associated links and retracting machine W from engagement with the sheets P.

In the underside of the slide plate 166 is a dovetail groove 175 formed on one side by a trapezoidal rib 176 and on the opposite side by a trapezoidal bar 178 adjustably secured to the slide plate by screws 180. Set screws 182, threaded into a rib 183 extending downwardly from the underside of the plate 166 and provided with lock nuts 184, engage the bar 178 to permit lateral adjustment of the width of the groove. An ear 186 is formed on the underside of the plate 166 adjacent the center of the dovetail groove 175, and secured in this ear against axial movement, as by means of collars 188, is a shaft 190, the ends of which are threaded in opposite directions and squared as at 192. Left and right hand slide plates 194 and 196, respectively, are slidably mounted in opposite ends of the dovetail groove 175 and each slide plate is formed at the outer end with an upwardly extending ear 198 (Fig. 5) in which is rigidly secured a nut 200 which engages a threaded end of the shaft 190. Rotation of the shaft 190 will thus vary the spacing of the slide plates 194 and 196 and a pair of attached squeeze rollers 214, described below.

Integral with each slide plate 194 and 196 is a depending arm 202 formed at its lower end into a bearing housing 204 having a passage 206 therein for the circulation of cooling fluid around the housing. A cover plate 208 is provided for each housing, and in each housing is a roller bearing 210 in which is mounted a shaft 212 on the opposite end of which shaft is secured one of the squeeze rollers 214. The axes of the shafts 212 are so arranged that the plane of each roller is at an angle to the vertical plane through the welding unit and each roller has a frusto-conical outer bearing surface 216 in order that firm contact may be made with the members being welded.

An oval shaped plate 218 is fastened to the forward end of slide plate 166 and extends downwardly to a point adjacent the lower end of the bearing housings 204. A shaft 222 extends through the lower end of the plate 218 and on the ends of this shaft are secured a pair of arms 224, the inner ends of which are slidably secured to the lower portions of the bearing housings 204. A presser-foot 226 is secured to the lower end of the plate 218 by screws 228, and the presser-foot is provided with a passage 230 for the circulation of cooling fluid therethrough. Conduits 100 connect each passage 206 to the passage 230 so that cooling fluid may be admitted to the passage 206 in one housing by an inlet conduit 102, pass from there through a conduit 100 to the passage 230 and thence through the other conduit 100 to the other passage 206, from which it is exhausted. As the unit U moves along the work, the presser-foot 226 bears on the meeting edges of the sheets in cooperation with a similar foot on the lower machine W', maintaining the sheet edges in alignment for welding.

A second dovetail groove 232, formed in the underside of the plate 166 near the rear thereof, slidably receives a blowpipe slide plate 234; and a threaded shaft 236 mounted in brackets 238 secured to the plate 166 is provided with a handle 240 and threadedly engages the slide plate 234 for moving the same relatively to the plate 166. In the lower side of the plate 234 is formed a dovetail groove 242 extending at right angles to the groove 232, and in the groove 242 is mounted a slide plate 244. Plate 244 is formed at one end with an ear 246 in which is secured by collars 248 a threaded shaft 250 which engages the plate 234, and by means of which the plate 244 may be moved relatively to the plate 234. Slide plates 234 and 244 permit adjustment of the blowpipe for the upper welding unit both longitudinally and transversely of the welding machine W, so that the blowpipe may be accurately positioned with respect to the work. A limit switch 251 is mounted on one of the ears 168, so that a roller 252 on the free end of its actuating arm 253 will contact the movable slide plate 166 after a predetermined upward movement of the latter to control the valve operating mechanisms V associated respectively with the upper machine W and the lower machine W' to close their associated valves; thereby interrupting the supply of gas to both blowpipes on the unit U.

Figure 6:
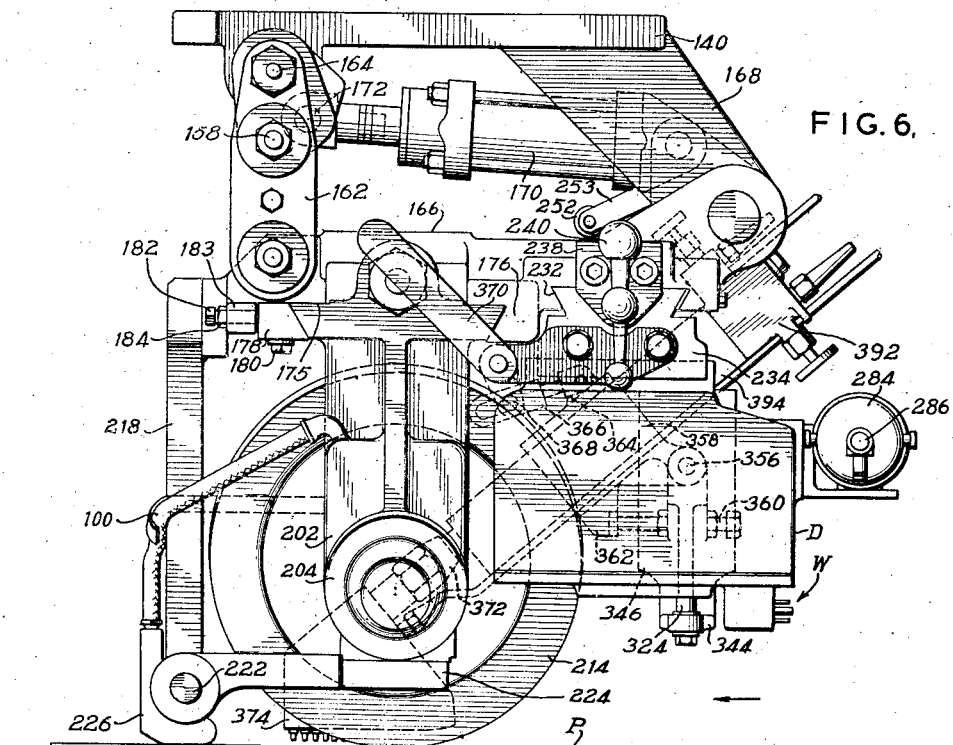
Fig. 6 is a side elevational view, partly in section, of the left hand welding unit, the view being taken from the rear of the apparatus shown in Fig. 1.
Figure 6A:
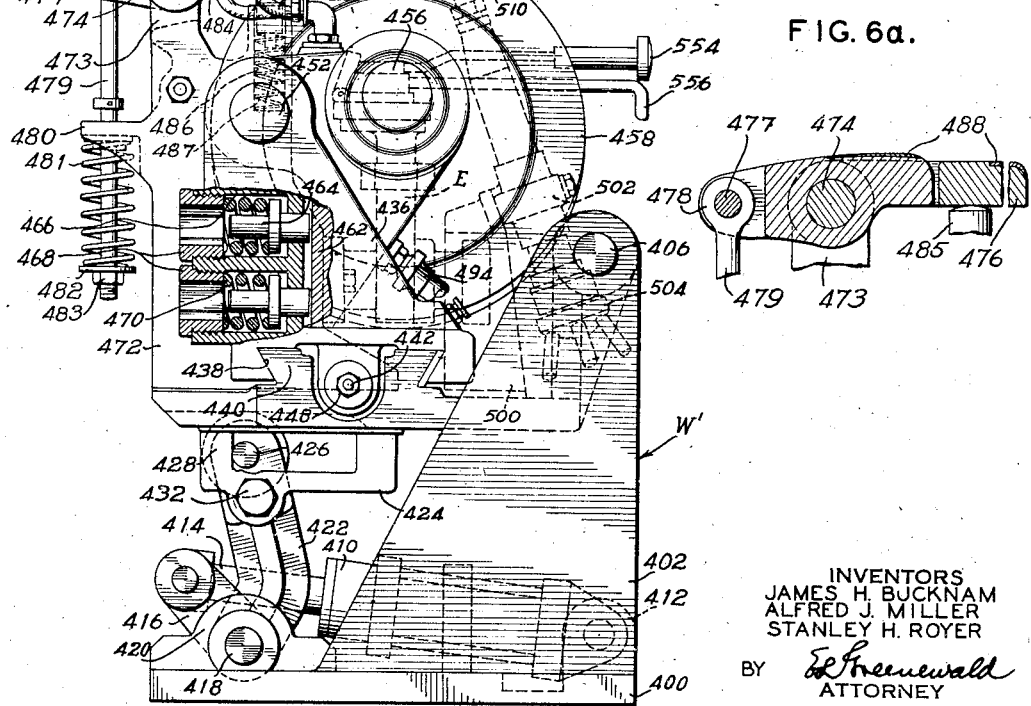
Fig. 6a is an enlarged longitudinal sectional view illustrating the arrangement of presser feet on the lower machine.
Figure 7:
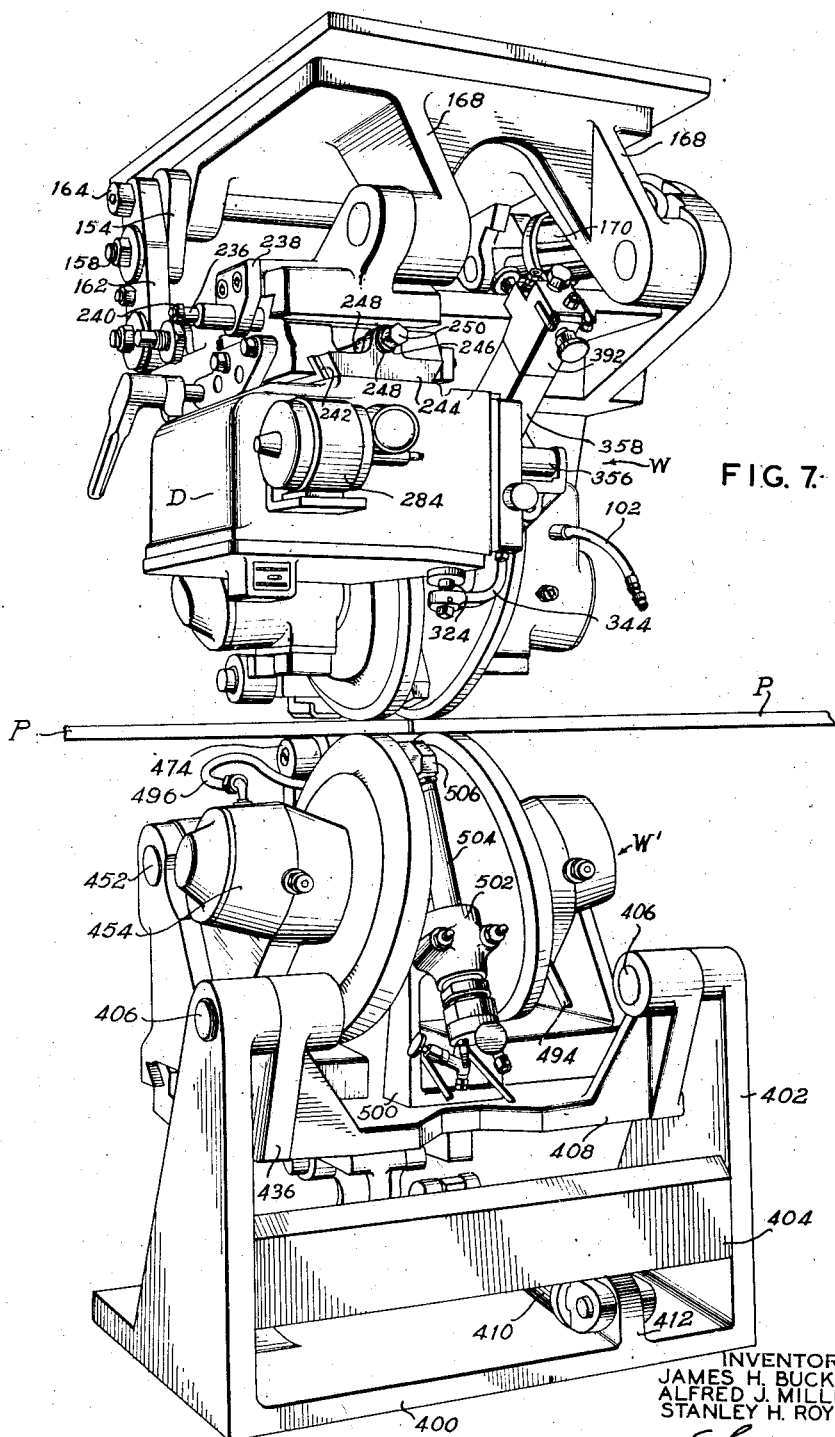
Fig. 7 is a perspective view of the rear end of the left hand welding unit.
Figure 8:
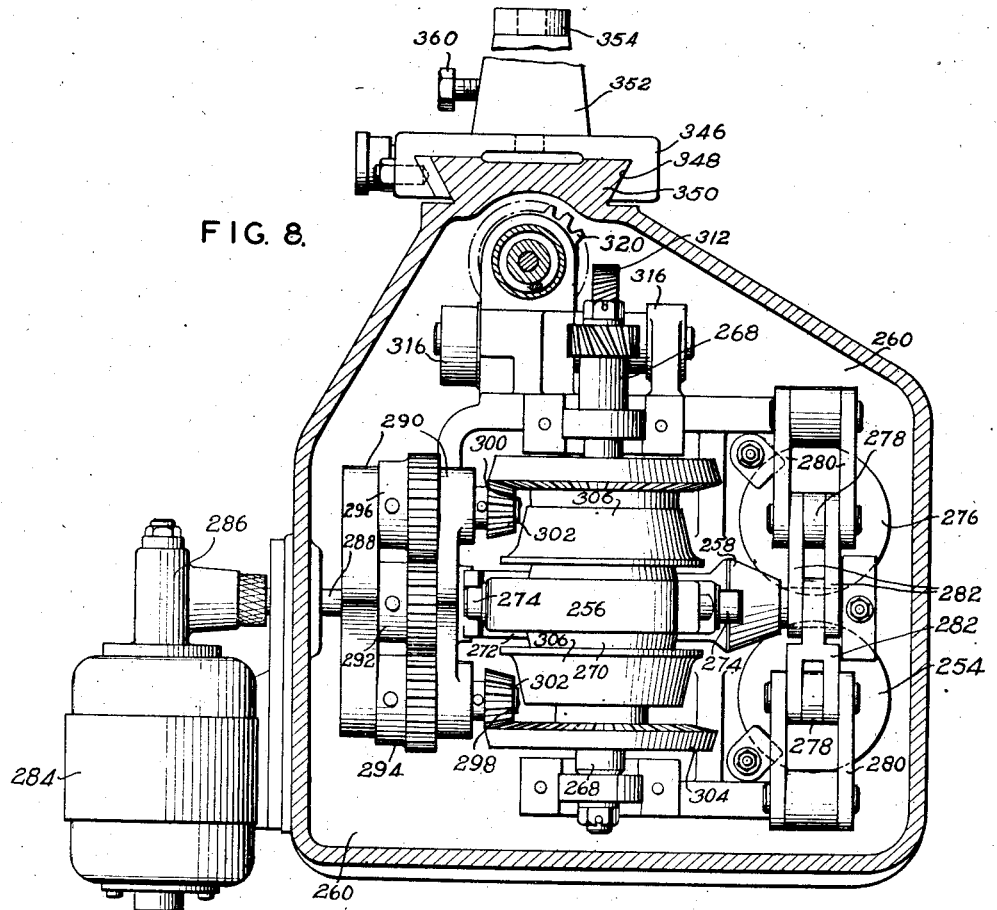
Fig. 8 is a view mainly in plan of the clutch mechanism for raising and lowering the upper blowpipe, the casing being shown in section.
Figure 9:
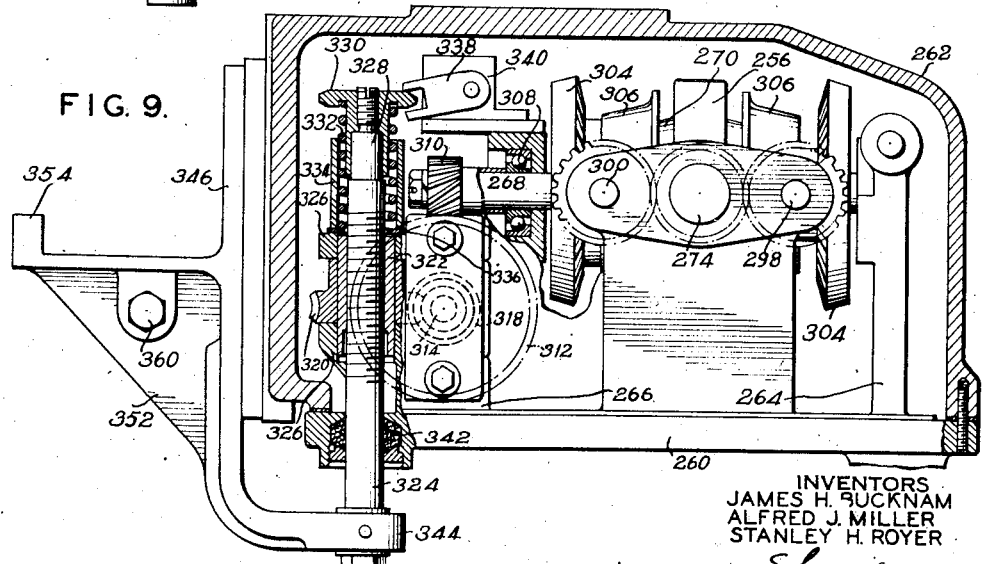
Fig. 9 is a side view, partly in section, of the apparatus shown in Fig. 8.

The clutch mechanism D, which mechanically adjusts the vertical position of the upper blowpipe with respect to the work to vary the amount of heat applied to the weld, is shown in detail in Figs. 8 and 9. This clutch mechanism comprises a base 260 and an enclosing housing 262 secured to the underside of slide plate 244 (Figs. 6 and 7). Brackets 264 and 266, formed integral with the base 260, rotatably support a shaft 268; and a double face male clutch member 270 is splined to the central portion of the shaft 268 so that it is free to slide longitudinally thereon. A yoke 272, pivotally secured to the base 260, is formed with arms 258 engaging lugs 274 on the collar 256 of the clutch member 270. Solenoids 254 and 276 are mounted on the base 260 between brackets 264 and 266 adjacent one side of the base, and to the plunger 278 of each solenoid are connected links 280 and 282. One pair of links 280 is pivotally connected at its opposite end to bracket 264 and the other pair to the bracket 266. Links 282 are pivotally connected together at their opposite ends and to one arm 258 of the yoke 272. Thus, the links connected to each plunger 278 form a toggle joint between one of the brackets and the yoke 272, whereby, when the solenoid is energized, its plunger will be pulled downwardly and, as the bracket is immovable, the yoke 272 will be forced in a direction away from the bracket, moving the male clutch member 270 into engagement with either of a pair of female clutch members described below.

A motor 284 is mounted on the rear of the housing 262 and the shaft of this motor, through a gear-reduction unit 286, drives a shaft 288 extending through one wall of the housing 262. Inside the housing, shaft 288 is mounted on bearings in a pair of spaced parallel plates 290 formed integral with the base 260. A gear 292, keyed to the shaft 288 and mounted between the plates 290, engages gears 294 and 296 mounted respectively on the shafts 298 and 300 rotatably mounted in the plates 290 on either side of the shaft 288. Shafts 298 and 300 extend through the inner plate 290 and on the inner end of each shaft is a small bevel gear 302, each of which gears engages a large bevel gear 304 formed on a female clutch member 306 mounted on radial bearings on the shaft 268. The motor 284 is constantly energized when the welding unit is in operation so that the female clutch members 306 rotate in opposite directions on the shaft 268. Accordingly, the shaft 268 may be made to rotate in one direction or the other dependent upon which female clutch member 306 is engaged by male clutch member 270 through energization of one of the solenoids 254 or 276. The shaft 268 extends outwardly beyond the bracket 266, in which it is mounted by means of roller bearings 308, and on this end of the shaft is keyed a spiral gear 310 meshing with a second spiral gear 312, which latter gear is mounted on a shaft 314 extending between plates 316, formed integral with the base 260, and the bracket 266. Worm 318, formed on one end of the shaft 314, engages a worm gear 320 press fitted on a sleeve 322 internally threaded to engage a shaft 324. Lugs 326, formed on the bracket 266, retain worm gear 320 against vertical movement. Shaft 324 is formed with an upper reduced threaded portion 328 on which is secured a limit switch collar 330. A spring 332, partially surrounded by an enclosing sleeve 334, engages this collar and a washer 336 supported on the top lug 326. The slotted arm 338 of a limit switch 340, mounted on the top of the bracket 266, engages the collar 330, and opens the limit switch to interrupt the pilot circuit to deenergize the solenoids 254 and 276 when the shaft 324 reaches its limit of movement in either direction. An electrical "plug-in" connection for the solenoid circuits and limit switches is secured to the lower side of base 260.

Shaft 324 extends through a suitable packing gland 342 in the base 260, and to its lower end is fixedly secured an arm 344 forming part of a bracket 346, provided on its inner face with a dovetail slot 348 slidably engaging a tongue 350 formed on the side of the housing 262.

Integral with the outer face of bracket 346, as best shown in Figs. 6, 8, and 9, is an outwardly extending arm 352 including a vertical lug 354 between which lug and the outer face of the bracket 346 extends a shaft 356 on which is pivotally mounted a supporting sleeve 358 for a blowpipe 392. An adjusting screw 360 threadedly engages the arm 352 and at one end abuts a lug 362 integral with the sleeve 358 to limit pivotal movement of the blowpipe 392 in one direction. A second lug 364, integral with the upper side of sleeve 358, is pivotally connected to an adjustable length slotted link 366; and a pin 368 formed on the end of a handle 370, which is pivotally connected to the blowpipe slide plate 234, slidably engages in the slotted end of link 366.

Rotation of handle 370 in one direction pivotally retracts blowpipe 392 from the work, and the above described linkage is so proportioned that it will lock the blowpipe in the retracted position until handle 370 is rotated in the opposite direction. It will be apparent that operation of the clutch mechanism D will cause vertical movement of bracket 346 and the attached blowpipe 392.

Although the outer casing 394 of the blowpipe 392 is rectangular to fit the supporting sleeve 358, the blowpipe is otherwise of standard construction, and includes the usual gas mixing chambers. A water cooled 20-flame welding head 374 is secured to the lower end of the blowpipe by a suitable connection 372, as best shown in Fig. 6. The welding head 374 is of the type described in the copending application of J. H. Bucknam, Serial No. 728,133, filed May 29, 1934, now Patent No. 2,130,261, issued September 13, 1938. The interior of the welding head 374 is substantially hollow to permit cooling fluid to circulate therethrough in any desired manner. While the blowpipe head 374 is shown as provided with 20 welding tips, it will be obvious that the number of tips may be varied to suit different operating conditions.

While the blowpipe moving mechanism for the upper blowpipe has been described above as comprising solenoid operated clutches and a constant speed motor, it will be obvious to those skilled in the art that a reversible motor directly connected to the blowpipe may be used in place of the solenoid controlled clutch construction. As such a modification will be obvious to those skilled in the art, it has not been deemed necessary to illustrate the same in the drawings.

The lower welding machine or carriage W' of the left hand unit U is mounted on a plate 400, bolted or otherwise secured to the lower slide S shown in Fig. 1. A pair of upstanding arms 402 connected by a cross-member 404 are welded to the upper side of plate 400 and in bosses formed in the ends of these arms are secured pins 406 pivotally supporting a slide plate 408. One end of a hydraulic cylinder 410 is pivotally secured to an ear 412 integral with the plate 400 adjacent one end thereof and the piston 414 of this cylinder is pivotally secured to a crank 416 which is welded to a shaft 418 mounted in pillow blocks 420 fastened to the plate 400. Keyed to this shaft 418 is an arm 422, the opposite end of which is forked and lies between two U-shaped brackets 424 secured to the lower portion of the slide plate 408. A pin 426, on which is a roller 428 engaging a recess 430 in the lower side of the slide plate 408, is mounted in the forked end of arm 422 and slides in the brackets 424; and a spring-pressed detent 432 mounted on one of the brackets 424 engages a recess in the forked end of arm 422 when the welding unit is in its upper position. With the above described arrangement, movement of the piston of the hydraulic cylinder will cause the welding unit to pivot about the pins 406 between its advanced and retracted positions.

On its upper surface, plate 408 slidably supports a pair of brackets 436 for transverse movement on the plate. Each bracket is provided on its under face with a dovetail groove 438 slidably engaging a tongue 440 on the plate 408. A shaft 442 is rotatably secured in a depending ear 444 on each of these brackets, and each shaft threadedly engages one of a pair of bosses 446 on the plate 408; whereby the bracket may be moved transversely of the plate 408. Each shaft 442 is provided with a square end 448 for engagement by suitable wrench or other tool for moving its associated bracket 436 transversely of plate 408.

Spaced ears 450 formed on the upper end of each bracket 436 support pins 452 on each of which is pivoted an idler roller housing 454. A shaft 456 is mounted on roller bearings in the free end of each housing and on the projecting end of each shaft is one of the lower idler rolls 458. Each housing is formed with a cooling fluid passage and a depending arm 462 engaged by a pair of spring-pressed plungers 464 mounted in recesses 466 in the brackets 436. Nuts 468 threadedly engaging the recesses 466 and the springs 470 therein, may be used to adjust the pressure with which the idler rollers 458 engage the under side of the sheets to be welded when the machine W' is in the operative position.

Another bracket 472 having an upper forked end 473 is bolted to the forward end of plate 408. A pin 474 is mounted in the forked end 473 of the bracket 472 and pivotally supports the main presser foot 475 and the auxiliary presser foot or "peaker" 476. The main presser foot 475 extends both forwardly and rearwardly of the pin 474, and the forward end is forked to receive a pin 477 on which is pivotally mounted the eye 478 of a rod 479 extending downwardly through an apertured ear 480 on the bracket 472. A spring 481, surrounding the lower end of rod 479 and engaging ear 480 and a collar 482 secured on rod 479 by nut 483, urges the rearward extension of foot 475 into engagement with the seam.

The auxiliary presser foot or "peaker" 476 is formed with spaced forwardly extending arms 484, straddling presser foot 475 and pivotally engaging the pin 474. A plunger 485, seated in a recess 486 in bracket 472, is resiliently urged upwardly into engagement with the "peaker" 476 by a spring 487 in the recess. The upper surface of "peaker" 476 is formed with a slight V contour transversely of the strip edges so as to exert an upward bending force on each of the opposed strip edges to "peak" or upset the adjacent strip edges slightly. Both presser feet are hard surfaced as at 488.

By resiliently mounting the lower presser rolls and presser feet, the pressure exerted by these elements may be controlled, and distortion, which would occur if excessive pressure were applied to the strip edges, be prevented. Furthermore, the resilient mounting of these elements automatically compensates for variations in thickness of the steel being welded. The presser feet and idler rolls on the upper and lower machines cooperate to maintain the sheets P in accurate alignment during welding.

A cooling fluid inlet tube 494 is connected to one housing 454 and conduits 496 extend between the passage in each housing and the interior of presser feet 475 and 476, so that fluid may circulate through the housings and presser feet and be conducted away by tubing connected to the passage of the second housing.

Bolted to the upper side of plate 408 is a hollow bracket 500 (Fig. 7), the spaced arms of which extend upwardly between the idler rollers 458 and rigidly support a sleeve 502 in which is slidably mounted a blowpipe 504 of the construction commonly used in oxy-acetylene welding. The blowpipe 504 is connected to a three-flame welding head 506, similar in construction to the welding head 374 on the upper blowpipe 392. As in the case of the upper blowpipe, the number of burner tips may be varied to best adapt the blowpipe for different welding conditions. A water spray block 508 for preventing the formation of craters in the weld is supported on head 506 by means of an adjustable bracket 510. The lower welding torch is not movable with respect to the slide plate 408 but is held in fixed adjustable relation thereto.

As previously explained, the quantity of heat applied to the weld is maintained constant by varying the distance between upper blowpipe 392 and the work. The position of the blowpipe is changed by actuation of the clutch mechanism D, which is operated in response to changes in radiant energy emission from the under side of the weld. These energy emissions affect the photoelectric cell unit E, which controls the clutch mechanism. The unit E is bolted or otherwise secured to the plate 408 and extends upwardly between the lower idler rolls at a point substantially in line with the line of contact of the upper and lower rolls with the sheets or strips to be welded. As shown in detail in Fig. 10, the unit E includes a housing 512 secured to the plate 408 and to which is fastened another housing 514 for the photoelectric cell 516. A tubular extension 518 extends upwardly from the housing 512 and mounted in this extension by means of rubber bushings 520 and 522, is a quartz rod 524. Both the housing 512 and the tubular extension 518 are externally wrapped with copper tubing through which cooling water is circulated to eliminate thermal disturbances on the photocell and the current produced thereby. In order to avoid confusion in the illustration of the photocell assembly, the tubing has been omitted from the drawings, particularly as its application will be immediately apparent to those skilled in the art. The upper end of the tubular extension is flanged as in 526 and secured to this flange is a water cup 528 provided with a cover 530. A water pan 532 is also secured to the flange 526 surrounding the water cup 528. Mounted for horizontal movement in the water cup on a shaft 534 is a wiper arm 536, provided with a rubber wiper 538 engaging the upper end of rod 524. A spring 540 surrounds the wiper arm for normally urging it to one position. A stud 542 is secured to the cover 530 and pivotally mounted on this stud is a shutter 544 for varying the amount of light falling upon the end of the quartz rod through a tubular opening 546 in the cover 530. Also pivotally connected to the water cup so that it may be swung into and out of a position in line with the quartz rod is a light-adjusting shield 548, the end 549 of which may be adjusted to focus a beam of light upon the end of the quartz rod. If desired, the light-adjusting shield 548 may be eliminated, and the shutter 544 modified to perform the function of the light-adjusting shield. An arm 550 is secured to the tubular extension 518 and extends outwardly and upwardly therefrom. At its outer end, this arm is formed with a plate 552 in which are mounted the shutter-control rod 554 and the wiper rod 556. A radio tube socket 558 is secured to the housing for the photoelectric cell, and suitable conduits 560 are connected to the water cup for providing cooling fluid at the upper end of the quartz rod adjacent the under side of the weld.

The oxygen and acetylene supplied to the upper blowpipe 392 and the lower blowpipe 504 of the left hand unit U are controlled by suitable regulators, the details of which form no part of the present invention. To prevent popping of the blowpipe tips when the blowpipes are operated, the supply of gas to each blowpipe is controlled by a motor driven sequence valve operating mechanism V. This type of valve mechanism, as adapted for manual actuation, is disclosed and claimed in the copending application of L. W. Young, Serial No. 169,921, filed October 20, 1937 now United States Patent No. 2,187,581. The present mechanism is essentially the same as the hand actuated mechanism with the exception of necessary changes to adapt it for motor actuation and the addition of an air or water supply valve operated by the acetylene valve operating lever. The valve mechanism is designed to open the oxygen valve first and close this valve last. The acetylene valve is opened after the oxygen valve has been opened and closed before the oxygen valve is closed. The air or water supply valve is opened and closed simultaneously with the acetylene valve.

Figure 11:
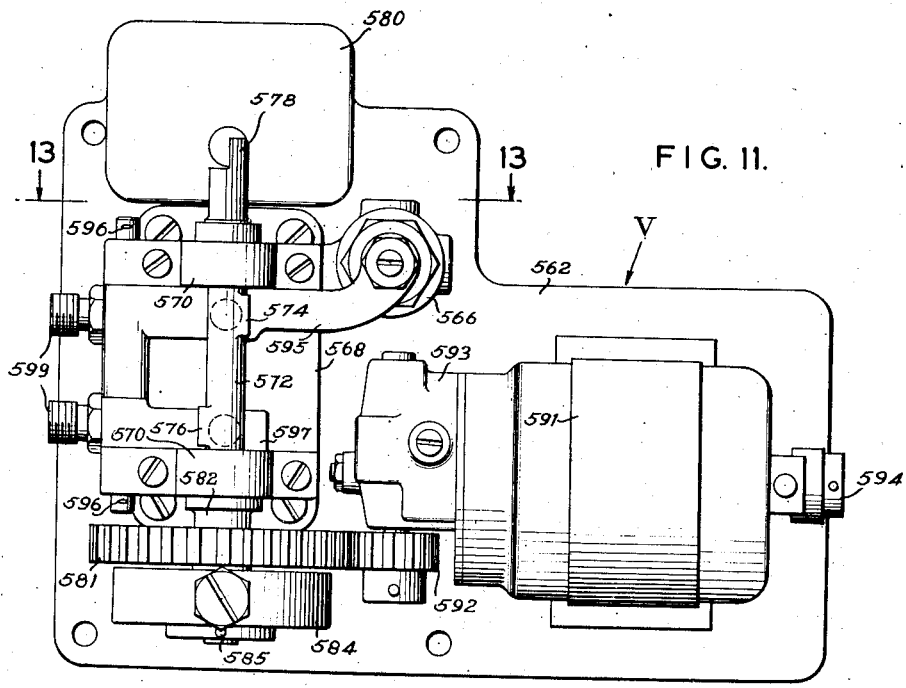
Fig. 11 is a plan view of the motor driven valve mechanism controlling the supply of gases to the blowpipes with the cover removed.
Figure 12:
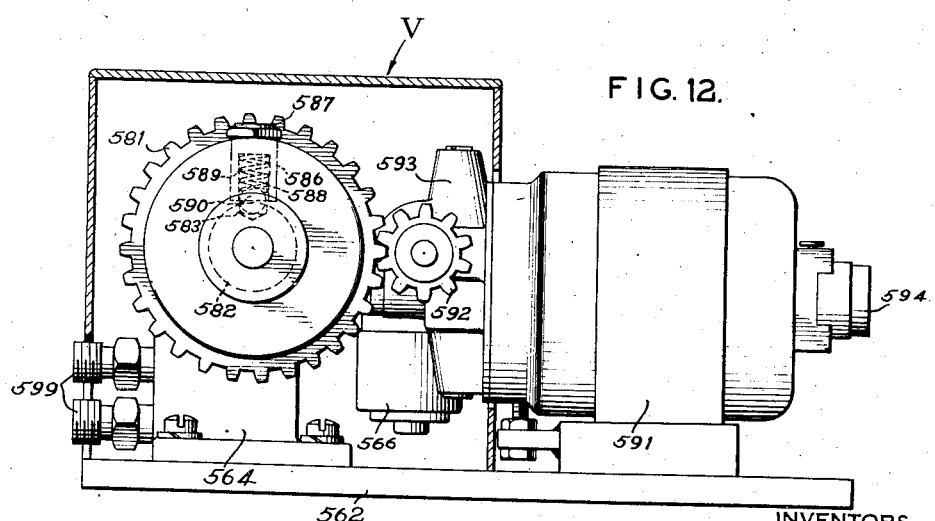
Fig. 12 is an end elevational view of the apparatus shown in Fig. 11.

The present motor-operated valve V, as shown in Figs. 11, 12, and 13, includes a base 562 upon which is mounted a valve block 564 in which are spring closed, plunger-operated valves for the oxygen and acetylene supply. Secured to the bonnet 568 of the valve-block 564 is a similar valve 566 for supplying an air blast to the upper welding machine or cooling fluid to the spray block 508 on the lower machine. Upstanding ears 570 on the bonnet rotatably support a shaft 572 on which are cams 574 and 576 for operating the valves in a predetermined sequence. One end of shaft 572 is formed with a cam 578 adapted to open a limit switch 580, mounted on base 562, when all the valves are fully open or fully closed. On the opposite end of shaft 572 is loosely mounted a large spur gear 581 provided with a hub 582. The outer end of the hub is notched as at 583 and a cage 584 overhangs this outer end and is pinned to the shaft 572 as at 585. The cage 584 is radially bored as at 586 and an adjusting screw 587 is threaded in the bore. In a socket 588 in the screw 587 is a spring 589 engaging a ball 590, mounted in the inner end of bore 586, and normally urging this ball into the notch 583. The above described arrangement constitutes a slip clutch drive between gear 581 and shaft 572.

A motor 591, mounted on the base 562, drives a small spur gear 592, engaging the gear 582, through a reduction unit 593. A spring loaded friction disc 594 is provided at the outer end of the motor shaft to prevent overrunning of the motor.

An arm 595, pivoted on a shaft 596 mounted on the back of bonnet 568, and which arm is engaged by cam 574, is adapted to engage the plungers of the acetylene valve and valve 566. Another arm 597, similarly pivoted, and engaged by cam 576, is adapted to engage the plunger of the oxygen valve. A spring 598 urges each arm upwardly into engagement with its associated cam.

The valve operating mechanism V operates as follows: When the motor 591 is energized through a circuit closed by a push button on the control board B, the shaft 572 and cams 574 and 576 are rotated in a direction to first cause the cam 576 to depress arm 597 and open the oxygen valve, after which cam 574 depresses arm 595 to open the acetylene valve and valve 566. When the valves have all been fully opened, the cam 578 on the shaft 572 actuates the limit switch 580 to break the motor circuit. When it is desired to close the valves, another push button on control box B is depressed to complete a circuit for reversing the motor 591. Rotation of shaft 572 and cams 574, 576 in the opposite direction first permits the acetylene valve and valve 566 to close and then permits the oxygen valve to close. When all the valves are fully closed, cam 578 actuates limit switch 580 to again break the motor circuit. As may be seen from the drawings, bonnet 568 is provided with suitable openings for the conduits 599 and the electrical connections to switch 580 controlling motor 591.

The purpose of the slip clutch drive is to prevent damage to the mechanism in case of overrunning of the motor 591. If the motor does not stop immediately when cam 578 is at its limit of movement in either direction of rotation, ball 590 will ride up out of notch 583 disconnecting the motor drive from the cam shaft 572. The spring 589 will move ball 590 into notch 583 when bore 586 and notch 583 again become aligned, as will occur when the motor 591 is restarted.

As described at the beginning of this specification, when the welding operation is about to begin, either or both of the machines W and W' are moved into engagement with the sheets P by their associated hydraulic cylinders 170 and 410, respectively. The valve mechanisms V and V' are then actuated to supply the gas mixture to the blowpipes 382 and 562, respectively, the air blast for the upper units and the supply of water to the spray block 508. However, satisfactory welds may be formed without the use of the air blast on the upper unit. When the blowpipes have been lighted, the upper blowpipe, through the medium of clutch mechanism D is moved vertically into proper relation with the work to be welded and the motors M, M' energized to rotate shafts G, G' and move either or both of slides S, S' and units U, U' from either end toward the center of the welding line. As each unit moves along the welding line, its associated photoelectric cell assembly maintains the heat applied at a constant value through movement of the blowpipe 382. When either unit has completed its portion of the weld, its associated limit switch J or J' automatically retracts the machines W, W' from the sheets P, reverses movement of the unit and interrupts the circuit controlling the gas supply. When each unit has returned to its starting point, an associated limit switch deenergizes its driving motor M or M'. During the welding operation, cooling fluid from a suitable source is continually circulated through the idler roller housings, presser feet, blowpipe heads and the copper tubing on the photocell observation unit E.

The wiring diagram represented in Figs. 14a and 14b shows the various circuits for controlling the operation of the left hand welding unit. The circuits for controlling the operation of the right hand welding unit are the same as those for the left hand unit with the exception of certain changes which will be described hereinafter. The control apparatus, as may be seen from Fig. 1, includes a control box B, the relay panel R and the amplifying unit A for the photoelectric cell control, all of which are mounted on the frame F. Also mounted upon the frame F, either on separate panels or in the above listed control apparatus are the control circuits for the driving motors M and M' and for the clutch mechanism D.

For the sake of clarity, groups of wires connected to common pieces of apparatus in Figs. 14a and 14b have been shown as a single heavy line to represent multi-conductor cables. Also, in the wiring diagram, all push buttons, switches, and relays are shown in the positions which they occupy when the welding apparatus is inoperative.

Referring now in detail to Figs. 14a and 14b, wires 600 extend from a suitable source of alternating current to terminals 601 and 602 on the terminal board T. Similarly, wires 603 connected to a suitable source of direct current, extend to terminals 604 and 605 on the terminal board T. Connected to the wires 603 are wires 606 which extend to the right hand welding unit. Wires 607, 608, 609, and 610 extend, respectively, from the terminals 601, 602, 604, and 605 through the line switch L to the terminals 611, 612, 614, and 615, respectively, of the terminal board T. Thus when line switch L is closed terminals 611 and 612 are at A. C. bus potential and terminals 614 and 615 at D. C. bus potential.

From the terminals 611 and 612 a pair of wires 616 and 617 extend to the primary winding 618 of a transformer 619; and, from the secondary winding 620 of this transformer, a pair of wires 621 and 622 extend through the terminals 624 and 625 of the terminal board T' to the primary winding 626 of a transformer 627. The secondary winding 628 of the transformer 627 is connected by wires 629 and 630 to opposite terminals of a copper oxide rectifier 631. A wire 632 connected to the wire 621 extends therefrom to the terminal 634 of the terminal board T; and a wire 633 connected to wire 622 extends through terminal 635 to the common connection 643 of the armatures 644 and 644' of the motors 591 for the valve operating mechanisms V controlling the supply of gas to the upper and lower blowpipes, respectively.

Another wire 636 extends from the terminal 605 to the common connection 637 of the solenoids 638 and 639 of the solenoid operated hydraulic valves 56 and 58, and wires 640 and 641 extend between the terminals 624 and 625 and the motor 284 of the clutch mechanism D, which motor is therefore continuously energized whenever the line switch L is closed. However, a limit switch may be inserted in the motor circuit so that the motor is not energized until the unit has reached the welding position, which limit switch may be operated by movement of the unit to the welding position.

To bring the welding machines W, W' into position on the sheets to be welded, the operator depresses push button 645 which energizes the relay 646 through the following circuit: terminal 614, wire 609, line switch L, wire 647, junction 648, the contacts of push button 645, wire 649 and terminal 650, relay 646, wire 651, junction 652, wire 653, junction 654, wire 610 and terminal 615.

When thus energized, relay 646 completes the following circuit to the solenoid 638: terminal 604, one wire 603, junction 656, wire 657, junction 658, wire 659, relay arm 660, wire 661 and terminal 655, solenoid 638, junction 637, and wire 636 to terminal 605. The push button 645 should be retained in a depressed position until such time as the upper and lower welding machines W and W', respectively, are fully in position, through energization of the solenoid 638 which opens the hydraulic valve 56 to admit fluid to the hydraulic cylinders 170 and 410 which move the upper and lower welding machines W and W', respectively, into position on the sheets to be welded.

When the welding operation has been completed, the operator, by depressing push button 662, may energize the relay 663 through a circuit similar to that described for push button 645; which relay will in turn complete a circuit similar to that described for the relay 646 to energize the solenoid 639 which opens its associated hydraulic valve 58 to cause the hydraulic cylinders 170 and 410 to retract the welding machines W, W' from the work.

With the welding machines in position, the operator depresses the push button 664 which completes the following circuit to energize the stick relay 665: terminal 615, wire 610, junction 666, wire 667, relay 665, wire 668 and terminal 669, the contacts of push button 664, wire 670, junction 671, wire 672 and terminal 673, normally closed limit switch 674, wire 609 and terminal 614. A holding circuit for the relay 665 is completed through its relay arm 676 as follows: junction 671, wire 678, relay arm 676, wire 679 and terminal 680, the contacts of normally closed push button 681, junction 682, wire 683, junction 684 and wire 672 as previously described.

Relay 665, when energized, completes the circuit for causing the motor 591 of the valve mechanism V for the upper machine W to rotate in a direction to open the oxygen and acetylene valves 566 and valve 566 in sequence. This circuit is as follows: from one side of the secondary winding 620 of the transformer 619, through wire 632, junction 685, wire 686, front contact 687, wire 688, field winding 689 of the motor 591, wire 690, front contact 691, wire 692, junction 693, closed limit switch 694, junction 702, wire 695, armature 644 of motor 591, wire 696, junction 643, wire 633 and terminal 635 to the opposite side of the secondary winding 620 of the transformer 619. As the motor starts to rotate the limit switch 703 closes and when all the valves have moved to their fully open position, the limit switch 694 is opened thus breaking the circuit to the motor and stopping further operation thereof. The holding circuit for the relay 665 may be broken either by depressing the push button 681 or through operation of the normally closed limit switch 674, which is the limit switch 251 operated by the upward movement of plate 166 when machine W is retracted from the sheets P at the completion of its portion of the welding operation. In either instance, when the relay 665 becomes deenergized, the following circuit is then completed for causing the motor 591 of the valve mechanism V to rotate in the opposite direction to close its valves: from one side of secondary winding 620 of transformer 619, through wire 632 to junction 685, wire 686, back contact 697, wire 690, field 689 (in the opposite direction from that heretofore described) wire 688, back contact 698, wire 692, junction 693, limit switch 703 (now in the closed position) wire 699, back contact 700, wire 701, junction 702, wire 695, armature 644, wire 696, junction 643, wire 633 and terminal 635 to the opposite side of the secondary winding 620 of the transformer 619. The above circuit shunts the open limit switch 694.

As the motor starts to revolve, the limit switch 694, which has been previously opened, is closed, and, when all the valves are fully closed, the limit switch 703 opens to break the circuit for the motor. Push buttons 704 and 705 operate in conjunction with limit switch 674 and relay 706 to control the operation of the valve mechanism V for the lower machine W' in the same manner as described for the push buttons 664 and 681 controlling relay 665 and valve operating mechanism V for the upper machine W.

As previously stated, automatic control of the welding is accomplished by means of a photoelectric cell observation unit E mounted on the lower welding machine W' in a position to receive radiant energy from the lower side of the weld. This photoelectric cell unit, the construction of which has been previously described, is connected to an amplifying unit A similar to that described in U. S. Patent No. 2,089,014, issued on August 3, 1937, to J. H. Bucknam et al.; and from which current is taken to operate relays to cause a change in the position of the upper blowpipe 392 with respect to the welding seam. This mechanism comprises the clutch mechanism D, which, as also previously described, includes a motor 284 which operates continuously oppositely rotating female clutch members 306. Either of the oppositely rotating clutch members may be engaged by the movable male clutch member 270 to cause the upper blowpipe 392 to be raised or lowered with respect to the work, thus varying the penetration of the weld and maintaining the weld uniform. The amplifier unit A and the photocell observation unit E are shown in dotted outline in the wiring diagram. Parts of the control for clutch mechanism D may be mounted in the amplifying unit panel if desired. Also, if desired, the upper blowpipe 392 may be raised and lowered relatively to the work by manual control means independently of the automatic control. Both the automatic means and the manual means for raising and lowering the upper blowpipe will now be described.

Any variation in the welding heat from a predetermined normal amount will cause the photocell unit E either to increase or decrease the current output of the amplifier unit A, through the wires 707 and 708 extending through the terminals 709 and 710 of the terminal board T' to the zero-center relay 711, actuating this relay to cause its contact arm 712 to swing either to the left or to the right to engage either the contact 713 or the contact 714, respectively. If the contact arm 712 swings to the left, for instance, the relay 715 is energized through the following circuit: from one side of the secondary winding 626 of the transformer 627 through wire 629, copper oxide rectifier 631, wire 716 and terminals 717 and 718, contact arm 719 of "manual-automatic" switch X (which has been swung to the right to condition the apparatus for automatic operation); contact 720, wire 721 and terminals 722 and 723, contact arm 712, contact 713, junction 776, wire 724, relay 715, wire 725 and terminal 726, limit switch 727, junction 728, wire 729 and terminal 730, copper oxide rectifier 631, and wire 630 to the opposite side of secondary winding 628 of transformer 627. When energized, relay 715 completes the following circuits: (1) Terminal 615, wire 610, junction 731, wire 732 and terminal 733, junction 734, junction 745, relay arm 735, wire 736, relay 737, wire 738, junction 739, resistance 740, wire 741 and terminal 742, junction 743, wire 744 and wire 609 to terminal 614; (2) Junction 745, relay arm 746, wire 747 and terminals 748 and 749 to a light 750, and thence through junction 751 and wire 647 to wire 609 and terminal 614. The above circuit causes the light 750 to be illuminated whenever the blowpipe is in movement. The first circuit causes the relay 737 to be energized and this completes a circuit as follows: from junction 734 (which is connected to terminal 615 as previously described) through wire 752, junction 753, wire 754, junction 755, wire 756, relay arm 757, wire 758 and terminal 759, solenoid 254, junction 761, resistance 762, wire 763 and junction 743 which, as has been previously described, is connected to terminal 614. Energization of solenoid 254 causes the male clutch member 270 to engage one of the female clutch members 306 and rotate shaft 268 in a direction to raise the blowpipe. This movement continues as long as the photoelectric cell E receives an excess of radiant energy from the weld. However, the total amount of movement of the blowpipe in either direction is limited by either of the switches 727 or 764 (which are part of the limit switch 340), for protective purposes.

If the zero-center relay 711 had been so energized that its contact arm 712 had swung to the right to engage the contact 714, the relays 765 and 766 would have been energized to in turn cause energization of the solenoid 276 through circuits similar to those already described, and thus cause lowering of the blowpipe.

Manual control of the position of the upper blowpipe with respect to the work is accomplished through the medium of push buttons 768 and 769 which respectively control raising and lowering of the blowpipe. To condition the apparatus for manual operation the contact arm 719 of the "manual-automatic" switch X is moved to the left to engage the contact 770. To raise the blowpipe, push button 768 is depressed and closes the following circuit from contact 770 (the circuit to contact arm 719 is the same as previously outlined); contact 770, wire 771, junction 772, contacts of push button 768, wire 773 and terminals 774 and 775, junction 776, and relay 715, the rest of the circuit being as previously described. Depression of push button 769 lowers the blowpipe through a circuit similar to that just described.

As previously described, the amount of heat applied to the weld may be maintained constant by placing a suitable meter in the output circuit of the amplifier unit A and disposing this meter adjacent the operator's position. The operator, by observing the reading of this meter and operating the push buttons 768 and 769 may then maintain the position of the blowpipe with relation to the work at the proper point for supplying the desired constant amount of heat to the weld.

The driving motor M for moving the welding unit with respect to the sheets to be welded is preferably controlled by means of "forward," "reverse" and "stop" push buttons 777, 778, and 779, respectively, and limit switches 780, 781, 782, and 783, of which switches 780 and 783 are normally closed and switches 781 and 782 are normally open.

Depression of the "forward" push button 777 completes the following circuits: (1) Terminal 614, wire 609, wire 647, junction 785, wire 786, contacts of "stop" push button 779, wire 787, junction 788, wire 789, contacts of "forward" push button 777 and terminals 790 to one side of the "forward" relay 784. From the opposite side of the relay this circuit comprises wire 791, normally closed limit switch 780, junction 815, normally closed limit switch 783, wire 792, junction 793, wire 794, wire 610 and terminal 615; (2) Terminal 615, wire 610, wire 794, junction 793, wire 795, junction 796, wire 797, the contacts of "forward" push button 777, wire 798, junction 799, wire 800 and terminal 801 and junction 802. This circuit shunts the normally closed limit switch 783 in case the latter should be open. When relay 784 is energized, a holding circuit therefor is completed through its relay arm 803 as follows: junction 804, wire 805, relay arm 803, wire 806, junction 807, wire 808 and terminal 809, junction 788, wire 787, the contacts of "stop" push button 779, wire 786, junction 785, wire 647, wire 609 and terminal 614. This holding circuit may be broken by the opening of limit switch 780 or depression of "stop" push button 779.

The relay 784 energizes motor M through conventional circuits to move the welding unit U from the edges of the sheets toward the center to make the weld. When the welding unit U has moved a definite distance toward the center, limit switch 780 opens to open the circuit controlling relay 784 to stop forward movement of the unit U, and limit switch 781 closes to cause reverse movement of the unit through energization of "reverse" relay 804' as will be described below.

Depression of "reverse" push button 778 manually reverses the movement of the carriage through the following circuit: terminal 614, wire 609, wire 647, junction 785, wire 786, the normally closed contacts of "stop" push button 779, wire 787, junction 810, wire 811, contacts of "reverse" push button 778, wire 812 and terminal 813, relay 804', wire 814, junction 815, normally closed limit switch 783 and thence as previously described for "forward" push button 777. Depression of "reverse" push button 778 completes another circuit which extends from junction 796 through the contacts of push button 778, wire 816, junction 799 and wire 800 to shunt the normally closed limit switch 783 in case the latter is open, in the same manner as previously described in connection with the depression of push button 777. Relay 804' when energized causes reverse movement of the unit U and a holding circuit is completed for this relay which extends from wire 812 through junction 817, wire 818, junction 819, relay arm 820 and wire 821 to junction 822 and thence as previously described for the holding circuit for relay 784. The relay 804' may also be energized through closing of the limit switch 781 which completes a circuit extending from junction 823 through wire 824, switch 781, wire 825, junction 819, wire 818, junction 817, wire 812, and relay 804' and thence as previously described.

Depression of "stop" push button 779 stops all movement of the motor by opening the normally closed contacts 826 thereof. At the same time push button 779 completes a circuit through its normally open contacts 827 and wires 828 and 829, which circuit is parallel with the circuit of push button 662 for retracting the welding machines W and W' from the members to be welded.

Closing of limit switch 782 when unit U nears the center of the weld completes a circuit as follows: wire 808, junction 822, wire 830, switch 782, wire 831, junction 832, wire 833, relay 663, wire 834 and junction 652. This circuit energizes relay 663 to retract welding machines W and W' from the work. Limit switch 674 is opened by movement of slide plate 166 on machine W to deenergize relays 665 and 706 which then complete the circuits for the valve operating mechanisms V to close all the valves thereof. Limit switch 783 is the final limit switch breaking all motor circuits when the welding unit has returned to the starting point. While switches 780, 781, and 782 are shown separate, all may be combined in the switch J shown in Fig. 1 and which may have equivalent contact arrangements.

When it is desired that the right hand unit U' be operated entirely non-automatically, limit switches 780, 781, and 782 may be eliminated and a wire 835 connected between wires 800 and 791 as shown in dotted lines.

If the right hand unit U' is to be fully automatic in operation, the above limit switches are retained in the circuit and are so adjusted that the unit U' will pass the center of the weld and cover the overlap between itself and unit U before reversing.

If it is desired to simplify the control arrangement, the push buttons 645, 664, 704, and 777 may be combined in one push button having an equivalent contact arrangement and the push buttons 662, 681, 705, 778 and 779 combined in a second push button. By depressing a single push button, the operator can then move the unit into welding position, turn on the gases for the blowpipes and start the forward travel of the unit. If the switch X is thrown to its automatic photocell control position and the unit allowed to travel its full range, only this one button is necessary as the limit switches described above will reverse and retract the unit and cut off the supply of gas when the unit has completed its portion of the weld. A similar combined push button would correspondingly control the operation of the other unit.

If the unit is not to travel its full range, the second master push button or "inching" button, comprising buttons 662, 681, 705, 778, and 779, may be depressed to operate the unit in the same manner as the limit switches would in the case of full travel of the unit. The "inching" button may be used in combination with the first master button to "inch" the unit into welding position.

It should be understood that, while the above described control arrangements effect a preferred operation of the welding units U and U', the control circuits and limit switches may be rearranged, within the scope of the invention, to effect a different operation of these units, or of parts thereof, in the manner set forth at the beginning of this description. Thus, only one unit may be used to traverse the full length of the line to be welded, heating both the upper and lower sides of the work, or one or both units may be moved as described above and only one blowpipe on each unit operated so that one side only of the work is heated.

Furthermore, although the above method and apparatus have been described as employed for the welding of a single pair of sheets in a separate operation, it will be readily apparent that the method and apparatus of the invention may be incorporated in a continuous finishing process. In a typical arrangement for instance, the above described strip welding machine, the continuous pickling vats, and the cold finishing mills may be placed in alignment, so that the separate hot finished sheets may be welded together, pickled, washed, dried and cold finished in one continuous operation. This is possible because the welded joint made by the machine may, as previously stated, remain in the sheets during the cold finishing operation. In the above described continuous process, it will be apparent that the separate hot rolled strips may be weld united end to end into a single continuous strip either before or after the pickling and washing operations.

If desired, grinders may be mounted on each welding unit in a position behind the idler rollers to smooth the welded joint immediately after its formation.

Numerous other changes may be made in the details of the method and apparatus disclosed, and certain features may be used apart from others, without departing from the principles of the invention or sacrificing the advantages thereof.

What is claimed is:

1. Welding apparatus including, in combination, a carriage; means for moving said carriage along the juxtaposed edges of adjacent metal sheets; a welding blowpipe mounted on said carriage; a presser foot on said carriage engaging said sheets in advance of said blowpipe; bearing housings on said carriage; a roller mounted in each housing and engaging said sheets adjacent said blowpipe; and a water spray block mounted on said carriage behind said blowpipe.

2. Welding apparatus as claimed in claim 1, including adjustable resilient means for urging said rollers into engagement with said sheets.

3. Welding apparatus as claimed in claim 1, including means for adjusting the lateral spacing of said rollers.

4. Welding apparatus as claimed in claim 1, in which said rollers engage the under side of said sheets; a second carriage is operatively connected to said first carriage for movement as a unit therewith; rollers are mounted on said second carriage and engage the upper side of said sheets; a blowpipe is mounted on said second carriage for vertical adjustment with respect to said sheets; and a means, responsive to radiant energy emission from the work, is mounted on said first carriage and controls the vertical position of the blowpipe on said second carriage.

5. Welding apparatus including, in combination, a carriage; means for moving said carriage along the juxtaposed edges of adjacent metal sheets to be welded; a welding blowpipe mounted on said carriage; a bracket on said carriage and having a forked end; a pin mounted in the forked end of said bracket; a first presser foot pivotally mounted, intermediate its ends, on said pin; resilient means urging said first presser foot into engagement with the edges of said sheets; a second presser foot having a forked end straddling said first presser foot and pivotally mounted on said pin; and resilient means urging said second presser foot into engagement with the edges of said sheets.

6. Welding apparatus comprising, in combination, a carriage; means for moving said carriage along a seam to be welded; heating blowpipes mounted on said carriage; and a valve mechanism associated with each blowpipe for supplying a gaseous heating mixture thereto; each valve mechanism including a plurality of valves, a shaft, means for mechanically rotating said shaft, and cams on said shaft, each operatively associated with one of said valves, for operating said valves in a predetermined sequence.

7. Welding apparatus as claimed in claim 6, in which said means for mechanically rotating said shaft includes an electric motor and a slip clutch drive between said motor and said shaft; and said shaft is formed with a cam adapted to actuate a limit switch to break the electric circuit for said motor when all the valves are fully opened or fully closed.

8. Welding apparatus as claimed in claim 6, including means for retracting said blowpipes from the line to be welded; said means for mechanically actuating said shaft including an electric motor; and means mounted on said carriage and operative, in response to retraction of said blowpipes from the seam to be welded, to energize said motor to close said valves.

9. Welding apparatus as claimed in claim 6, in which said valve mechanism includes a valve for controlling the supply of cooling fluid to spray blocks associated with certain of said blowpipes, and means for actuating said last-named valve in synchronism with one of said first-named valves.

10. Welding apparatus including, in combination, a carriage; means for moving said carriage along a seam to be welded; a blowpipe mounting plate on said carriage; a blowpipe pivotally supported on said mounting plate; means for horizontally adjusting said pipe with respect to the longitudinal and transverse center lines of said carriage; means for rotating said blowpipe to a retracted position and retaining the blowpipe in that position; and means for automatically adjusting the vertical distance of said blowpipe from said seam to maintain the heat applied thereto at a substantially constant value.

11. Welding apparatus as claimed in claim 10, in which said last-named means comprises a housing; a bracket slidably mounted on said housing and supporting said blowpipe; a threaded shaft slidably mounted in said housing and rigidly secured to said bracket; an internally threaded sleeve operatively associated with said threaded shaft; a second shaft in said housing; gearing connecting said second shaft to said sleeve; a pair of female clutch members loosely mounted on said second shaft; means for rotating said female clutch members in opposite directions; a male clutch member splined to said second shaft and movable longitudinally thereof to engage either of said female clutch members; a pair of solenoids operatively associated with said male clutch member; means, responsive to the heat applied to the line to be welded for selectively energizing said solenoids to engage said male clutch member with one of said female clutch members to rotate said sleeve to move said threaded shaft and bracket relatively to said housing; and means to limit the movement of said threaded shaft in either direction.

12. Welding apparatus as claimed in claim 10, including adjustable means for limiting the rotational movement of said blowpipe in one direction.

13. Welding apparatus comprising, in combination, means for maintaining adjoining edges of a pair of metal sheets in abutting relation; a heating unit; means disposed adjacent either side of said heating unit for maintaining the adjoining edges in accurate alignment; means mounted beneath the forward portion of said heating unit and exerting an upward pressure on the adjoining edges of said sheets to slightly upset the adjoining edges thereof; and mechanism for moving said heating unit, said alignment maintaining means, and such upsetting means along said edges to weld unite the same.

14. In combination, a welding blowpipe movable along a seam to be welded; a plurality of valves controlling the flow of gases to said blowpipe; electrically operated means for actuating said valves in a predetermined sequence; a switch; means for actuating said switch to establish one energizing circuit for said electrically operated means; means retaining said switch in said actuated position; and means, responsive to the movement of said blowpipe, for actuating said switch to establish another energizing circuit for said electrically operated means.

15. A method of uniting sheet steel members edge to edge which comprises holding such edges in abutting relation; progressively clamping said edges in coplanar alignment; progressively heating said edges; and progressively exerting an upward force against said edges to upset said edges as they are heated to weld unite said members.

JAMES H. BUCKNAM.
ALFRED J. MILLER.
STANLEY H. ROYER.

CERTIFICATE OF CORRECTION.

Patent No. 2,344,534. March 21, 1944.

JAMES H. BUCKNAM, ET AL.

It is hereby certified that error appears in the printed specification of the above numbered patent requiring correction as follows: Page 8, first column, line 14, for "ap ush" read --a push--; page 10, second column, line 13, for "terminals" read --terminal--; page 12, first column, line 40, claim 10, for "pipe" read --plate--; and that the said Letters Patent should be read with this correction therein that the same may conform to the record of the case in the Patent Office.

Signed and sealed this 16th day of May, A. D. 1944.

Leslie Frazer

Acting Commissioner of Patents.

(Seal)